(12) United States Patent  (10) Patent No.: US 8,479,996 B2
Barkan et al.  (45) Date of Patent: Jul. 9, 2013

(54) IDENTIFICATION OF NON-BARCODED PRODUCTS

(75) Inventors: Edward D. Barkan, Miller Place, NY (US); Robert Sanders, St. James, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 259 days.

(21) Appl. No.: 12/266,642

(22) Filed: Nov. 7, 2008

(65) Prior Publication Data

US 2010/0116887 A1  May 13, 2010

(51) Int. Cl.
*G06K 7/10* (2006.01)

(52) U.S. Cl.
USPC ............ 235/462.43; 235/462.17; 235/462.38; 235/462.36; 235/462.41; 235/462.44

(58) Field of Classification Search
USPC ............ 235/462.32, 462.41, 462.36, 462.43, 235/462.44, 440, 462, 383, 462.17, 462.38, 235/462.4; 705/16, 28, 407, 414
See application file for complete search history.

(56) References Cited

U.S. PATENT DOCUMENTS

| | | | |
|---|---|---|---|
| 3,211,046 A | 10/1965 | Kennedy | |
| 3,947,816 A | 3/1976 | Rabedeau | |
| 4,613,895 A | 9/1986 | Burkey et al. | |
| 4,794,239 A | 12/1988 | Allais | |
| 5,058,188 A * | 10/1991 | Yoneda | 382/313 |
| 5,059,779 A | 10/1991 | Krichever et al. | |
| 5,124,539 A | 6/1992 | Krichever et al. | |
| 5,200,599 A | 4/1993 | Krichever et al. | |
| 5,304,786 A | 4/1994 | Pavlidis et al. | |
| 5,559,562 A | 9/1996 | Ferster | |
| 5,703,349 A | 12/1997 | Meyerson et al. | |
| 5,705,802 A | 1/1998 | Bobba et al. | |

(Continued)

FOREIGN PATENT DOCUMENTS

EP  1006475 A2  6/2000
EP  1223535 B1  6/2009

(Continued)

OTHER PUBLICATIONS

International Search Report and Written Opinion dated Jan. 28, 2010 in related case PCT/US2009/061838.

(Continued)

*Primary Examiner* — Michael G Lee
*Assistant Examiner* — Tabitha Chedekel
(74) *Attorney, Agent, or Firm* — Nong-Qiang Fan

(57) ABSTRACT

The present disclosure concerns a bar code reader 10 that can both interpret bar codes and determine a feature of a target object 230 not having a bar code affixed thereto. The bar code reader includes a housing including one or more transparent windows H, V and defining a housing interior region. As a target object is swiped or presented in relation to the transparent windows an image of the target object is captured. A camera C1-C6 has an image capture sensor array positioned within the housing interior region for capturing an image of a bar code within a camera field of view. An image processing system has a processor for decoding a bar code carried by the target object. If the target object has no bar code, the image processing system determines a feature such as a dimension of the target object from images captured by the imaging system.

13 Claims, 9 Drawing Sheets

U.S. PATENT DOCUMENTS

| | | | |
|---|---|---|---|
| 5,717,195 A | | 2/1998 | Feng et al. |
| 5,801,370 A | | 9/1998 | Katoh et al. |
| 5,936,218 A | | 8/1999 | Ohkawa et al. |
| 5,987,428 A | * | 11/1999 | Walter ............... 705/23 |
| 6,006,990 A | | 12/1999 | Ye et al. |
| 6,141,062 A | | 10/2000 | Hall et al. |
| 6,330,973 B1 | | 12/2001 | Bridgelall et al. |
| 6,336,587 B1 | * | 1/2002 | He et al. ............... 235/462.45 |
| 6,340,114 B1 | | 1/2002 | Correa et al. |
| 6,392,688 B1 | | 5/2002 | Barman et al. |
| 6,538,243 B1 | | 3/2003 | Bohn et al. |
| 6,629,642 B1 | | 10/2003 | Swartz et al. |
| 6,899,272 B2 | | 5/2005 | Krichever et al. |
| 6,924,807 B2 | | 8/2005 | Ebihara et al. |
| 6,951,304 B2 | | 10/2005 | Good |
| 6,991,169 B2 | | 1/2006 | Bobba et al. |
| 7,076,097 B2 | | 7/2006 | Kondo et al. |
| 7,116,353 B2 | | 10/2006 | Hobson et al. |
| 7,191,947 B2 | | 3/2007 | Kahn et al. |
| 7,219,831 B2 | | 5/2007 | Murata |
| 7,280,124 B2 | | 10/2007 | Laufer et al. |
| 7,416,119 B1 | * | 8/2008 | Inderrieden ............... 235/383 |
| 7,430,682 B2 | | 9/2008 | Carlson et al. |
| 7,475,823 B2 | | 1/2009 | Brock |
| 7,533,819 B2 | | 5/2009 | Barkan et al. |
| 7,543,747 B2 | | 6/2009 | Ehrhart |
| 7,619,527 B2 | | 11/2009 | Friend et al. |
| 7,757,955 B2 | | 7/2010 | Barkan et al. |
| 8,079,523 B2 | | 12/2011 | Barkan et al. |
| 2001/0042789 A1 | * | 11/2001 | Krichever et al. ....... 235/462.14 |
| 2002/0138374 A1 | * | 9/2002 | Jennings et al. ............... 705/29 |
| 2002/0162887 A1 | * | 11/2002 | Detwiler ............... 235/462.4 |
| 2003/0029915 A1 | | 2/2003 | Barkan et al. |
| 2003/0078849 A1 | * | 4/2003 | Snyder ............... 705/23 |
| 2003/0082505 A1 | * | 5/2003 | Frohlich et al. ............... 434/180 |
| 2003/0102377 A1 | | 6/2003 | Good |
| 2003/0122093 A1 | * | 7/2003 | Schauer ............... 250/559.29 |
| 2003/0213841 A1 | | 11/2003 | Josephson et al. |
| 2004/0146211 A1 | | 7/2004 | Knapp et al. |
| 2004/0189472 A1 | | 9/2004 | Acosta et al. |
| 2005/0098633 A1 | | 5/2005 | Poloniewicz et al. |
| 2005/0259746 A1 | | 11/2005 | Shinde et al. |
| 2006/0022051 A1 | | 2/2006 | Patel et al. |
| 2006/0043193 A1 | | 3/2006 | Brock |
| 2006/0118628 A1 | * | 6/2006 | He et al. ............... 235/454 |
| 2006/0180670 A1 | | 8/2006 | Acosta et al. |
| 2007/0001013 A1 | | 1/2007 | Check et al. |
| 2007/0079029 A1 | | 4/2007 | Carlson et al. |
| 2008/0011846 A1 | * | 1/2008 | Cato ............... 235/435 |
| 2008/0122969 A1 | | 5/2008 | Alakarhu |
| 2008/0128509 A1 | | 6/2008 | Knowles et al. |
| 2008/0296382 A1 | | 12/2008 | Connell, II et al. |
| 2009/0026271 A1 | | 1/2009 | Drzymala et al. |
| 2009/0084854 A1 | | 4/2009 | Carlson et al. |
| 2010/0102129 A1 | | 4/2010 | Drzymala et al. |
| 2010/0165160 A1 | | 7/2010 | Olmstead et al. |

FOREIGN PATENT DOCUMENTS

| | | | |
|---|---|---|---|
| WO | 0182214 A1 | 11/2001 | |
| WO | 2009006419 A1 | 1/2009 | |
| WO | 2010053682 A1 | 5/2010 | |

OTHER PUBLICATIONS

International Preliminary Report on Patentability and Written Opinion for International Application No. PCT/US2009/061838 mailed on May 19, 2011.

International Search Report and Written Opinion for International Patent Application No. PCT/US2009/067816 mailed on Mar. 26, 2010.

Non Final Office Action mailed on May 2, 2011 in U.S. Appl. No. 12/334,830, Edward D. Barkan, filed on Dec. 15, 2008.

Notice of Allowance mailed on Oct. 17, 2011 in U.S. Appl. No. 12/334,830, Edward D. Barkan, filed on Dec. 15, 2008.

International Preliminary Report on Patentability and Written Opinion for International Application No. PCT/US2009/067816 mailed on Jun. 30, 2011.

International Search Report and Written Opinion for International Patent Application No. PCT/US2009/061218 mailed on Jan. 25, 2010.

Non Final Office Action mailed on Sep. 30, 2010 in U.S. Appl. No. 12/260,168, Mark Drzymala, filed on Oct. 29, 2008.

Final Office Action mailed on May 11, 2011 in U.S. Appl. No. 12/260,168, Mark Drzymala, filed on Oct. 29, 2008.

International Preliminary Report on Patentability and Written Opinion for International Patent application No. PCT/US2009/061218 mailed on May 12, 2011.

Notice of Allowance mailed on Apr. 19, 2010 in U.S. Appl. No. 12/112,275, Edward D. Barkan, filed on Apr. 30, 2008.

Non Final Office Action mailed Sep. 7, 2011 in related U.S. Appl. No. 12/241,153, Mark Drzymala, filed on Sep. 30, 2008.

International Search Report and Written Opinion for counterpart International Application No. PCT/US2008/068810 mailed on Feb. 10, 2008.

Notice of Allowance mailed Jun. 30, 2010, in U.S. Appl. No. 11/823,818, Edward D. Barkan, filed on Jun. 28, 2007.

Notice of Allowance mailed Jun. 1, 2010, in U.S. Appl. No. 11/823,818, Edward Barkan, filed on Jun. 28, 2007.

Non Final Office Action mailed Jan. 20, 2010, in U.S. Appl. No. 11/823,818, Edward Barkan., filed on Jun. 28, 2007.

Notice of Allowance mailed Sep. 9, 2011, in counterpart U.S. Appl. No. 12/315,235, James Giebel, filed on Dec. 1, 2008.

Notice of Allowance mailed Jun. 17, 2011, in counterpart U.S. Appl. No. 12/315,235, James Giebel, filed on Dec. 1, 2008.

Australian Office Action mailed Nov. 2, 2010, in Australia for counterpart Application No. 2008272946.

Non Final Office Action mailed Oct. 31, 2011, in counterpart U.S. Appl. No. 12/245,111, Mark Drzymala, filed on Oct. 3, 2008.

International Preliminary Report on Patentability for and Written Opinion International Patent Application No. PCT/US2008/068810 mailed on Jan. 14, 2010.

Final Office Action mailed May 23, 2012 in counterpart U.S. Appl. No. 12/241,153, Mark Drzymala, filed Sep. 30, 2008.

* cited by examiner

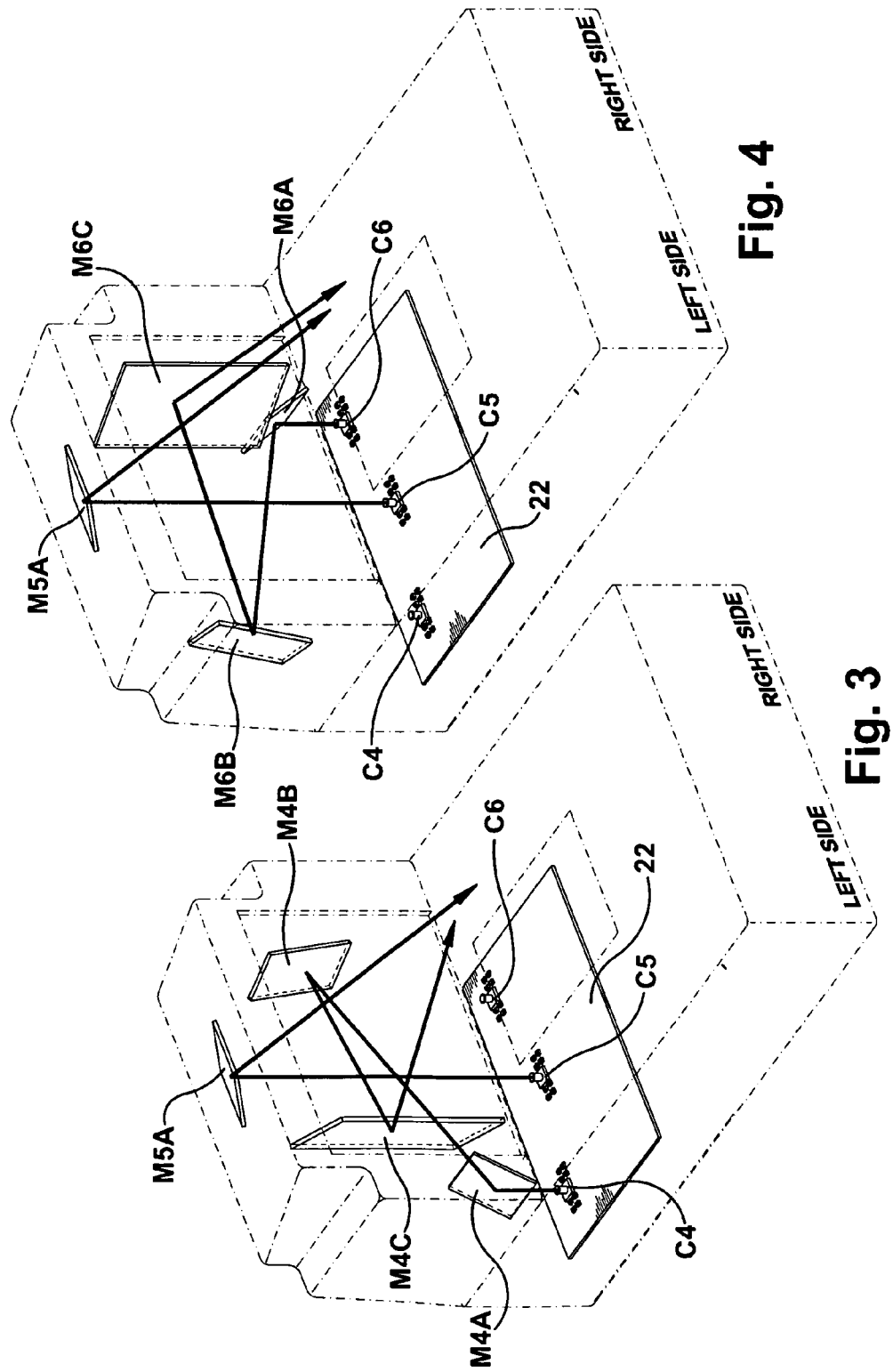

IDENTIFICATION OF NON-BARCODED PRODUCTS

FIELD OF THE INVENTION

The present invention relates to an imaging-based bar code reader for identifying non-barcoded products.

BACKGROUND OF THE INVENTION

A bar code is a coded pattern of graphical indicia comprised of a series of bars and spaces of varying widths, the bars and spaces having differing light reflecting characteristics. The pattern of the bars and spaces encode information. Bar code may be one dimensional (e.g., UPC bar code) or two dimensional (e.g., DataMatrix bar code). Systems that read, that is, image and decode bar codes employing imaging camera systems are typically referred to as imaging-based bar code readers or bar code scanners.

Imaging-based bar code readers may be portable or stationary. A portable bar code reader is one that is adapted to be held in a user's hand and moved with respect to a target indicia, such as a target bar code, to be read, that is, imaged and decoded. Stationary bar code readers are mounted in a fixed position, for example, relative to a point-of-sales counter. Target objects, e.g., a product package that includes a target bar code, are moved or swiped past one of the one or more transparent windows and thereby pass within a field of view of the stationary bar code readers. The bar code reader typically provides an audible and/or visual signal to indicate the target bar code has been successfully imaged and decoded.

A typical example where a stationary imaging-based bar code reader would be utilized includes a point of sale counter/cash register where customers pay for their purchases. The reader is typically enclosed in a housing that is installed in the counter and normally includes a vertically oriented transparent window and/or a horizontally oriented transparent window, either of which may be used for reading the target bar code affixed to the target object, i.e., the product or product packaging for the product having the target bar code imprinted or affixed to it. The sales person (or customer in the case of self-service check out) sequentially presents each target object's bar code either to the vertically oriented window or the horizontally oriented window, whichever is more convenient given the specific size and shape of the target object and the position of the bar code on the target object.

A stationary imaging-based bar code reader that has a plurality of imaging cameras can be referred to as a multi-camera imaging-based scanner or bar code reader. In a multi-camera imaging reader, each camera system typically is positioned behind one of the plurality of transparent windows such that it has a different field of view from every other camera system. While the fields of view may overlap to some degree, the effective or total field of view of the reader is increased by adding additional camera systems. Hence, the desirability of multi-camera readers as compared to single camera readers which have a smaller effective field of view and require presentation of a target bar code to the reader in a very limited orientation to obtain a successful, decodable image, that is, an image of the target bar code that is decodable.

U.S. Pat. No. 5,717,195 to Feng et al concerns an "Imaging Based Slot Datform Reader" having a mirror, camera assembly with photosensor array and a illumination system. The disclosure of this patent is incorporated herein by reference.

Barcode scanners using imagers have become common in many retail applications. In theory, an imaging barcode reader could capture an image of an item such as a screw, bolt, washer etc to identify the product. Merely capturing an image is not enough to allow the particular part to be identified. Identifying a screw requires a measurement of the length and diameter of the screw's threaded portion. The identification also requires thread pitch and an identification of the screw head. Both the shape and the size of the features must be obtained to accurately identify the screw. Similar measurements are needed to identify a bolt, washer, nail etc.

Some items sold in retail stores do not have labels bearing barcodes so they cannot be scanned at the cash register. Examples of such products are screws, nails, nuts and washers all of which can be purchased at home improvement stores. When these items are purchased the sales clerk must identify the item, typically by comparing it to a picture located near the cash register and then manually entering a SKU number via the cash register keyboard. This is time consuming and there is a good chance the wrong SKU number will be entered either because the wrong item is identified or the clerk makes an error in entering the SKU into the cash register. Other items such as fruit or vegetables are sold in supermarkets that do not have bar codes but may have identifying indicia which must be manually entered by the clerk.

SUMMARY OF THE INVENTION

The present disclosure concerns a bar code reader that can both interpret bar codes and determine a feature of a target object not having a bar code affixed thereto. The bar code reader includes a housing including one or more transparent windows and defining a housing interior region. As a target object is swiped or presented in relation to the transparent windows an image of the target object is captured.

A camera has an image capture sensor array positioned within the housing interior region for capturing an image of a bar code within a camera field of view. An image processing system has a processor for decoding a bar code carried by the target object. If the target object has no bar code, the image processing system determines a feature of the target object from images captured by the imaging system.

These and other objects, advantages, and features of the exemplary embodiment of the invention are described in detail in conjunction with the accompanying drawings.

BRIEF DESCRIPTION OF THE DRAWINGS

FIGS. 3 and 4 are perspective views showing a position of three additional cameras forming a portion of a plurality of cameras located on a printed circuit board resulting in a total of six cameras constructed in accordance with one example embodiment of the present disclosure;

DETAILED DESCRIPTION

Figure 1:
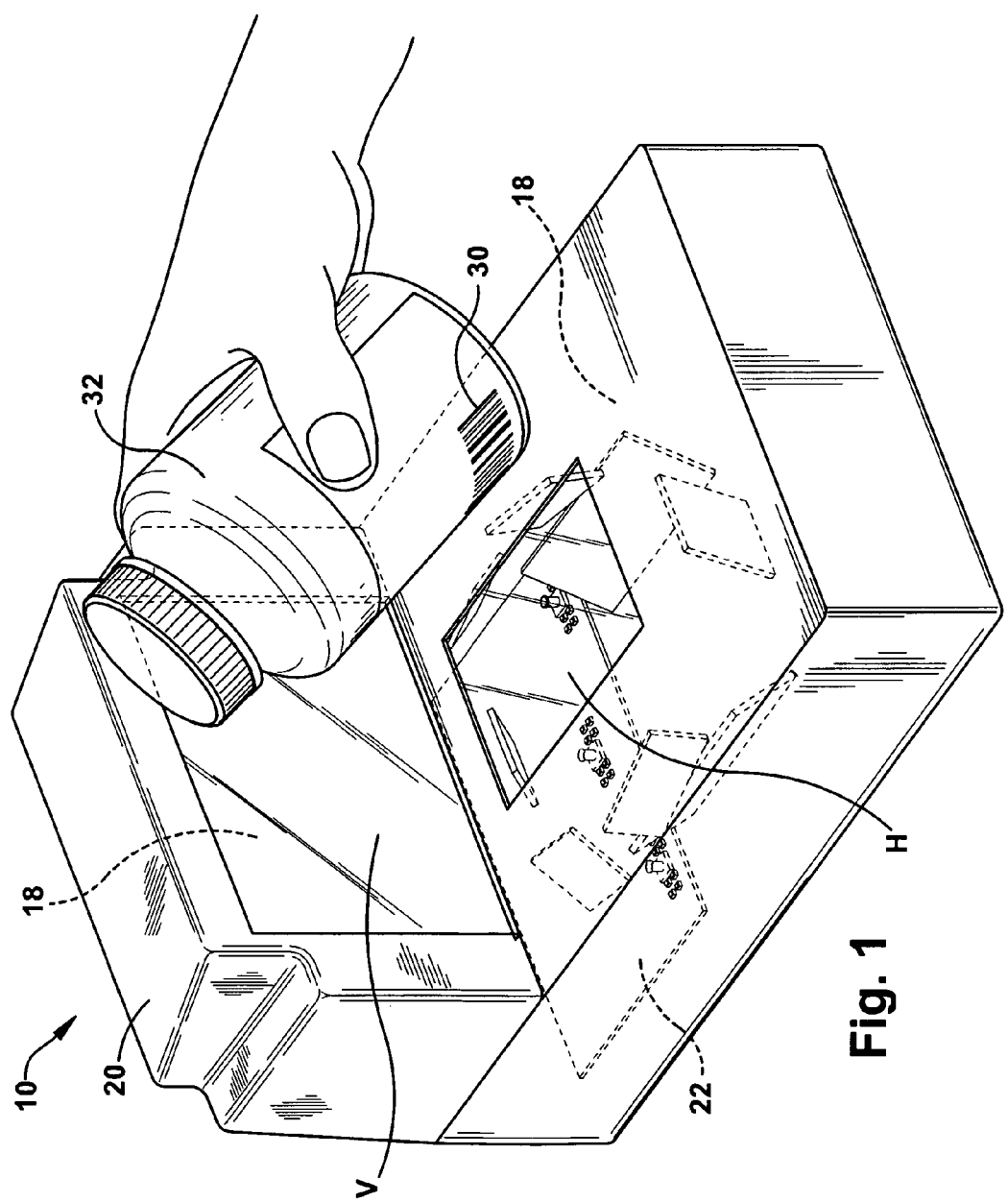
FIG. 1 is a perspective view of a bar code reader having a vertical and a horizontal window through which bar codes are viewed by multiple cameras within the reader constructed in accordance with one example embodiment of the present disclosure.

FIG. 1 depicts a stationary bar code reader 10 having an image and decoder system supported within an interior region 18 of a housing 20 (see FIG. 1). The housing 20 may be integrated into a sales counter that of a point of sales system that includes, for example, a cash register, a touch screen visual display or other type user interface and a printer for generating sales receipts. The housing 20 depicted in FIG. 1 includes two transparent windows H, V so that objects moved or positioned outside the housing can be imaged.

In the exemplary embodiment, multiple cameras C1-C6 are mounted to a printed circuit board 22 inside the housing and each camera defines a two-dimensional field-of-view FV1, FV2, FV3, FV4, FV5, FV6. Positioned behind and adjacent to the windows H, V are reflective mirrors that define a given camera field-of-view such that the respective fields-of-view FV1-FV6 pass from the housing 20 through the windows to create an effective total field-of-view (TFV) for the reader 10 in a region of the windows H, V, outside the housing 20. Because each camera C1-C6 has an effective working range WR (shown schematically in FIG. 5) over which a target bar code 30 may be successfully imaged and decoded, there is an effective target area in front of the windows H, V within which a target bar code 30 presented for reading may be successfully imaged and decoded.

Figure 11:
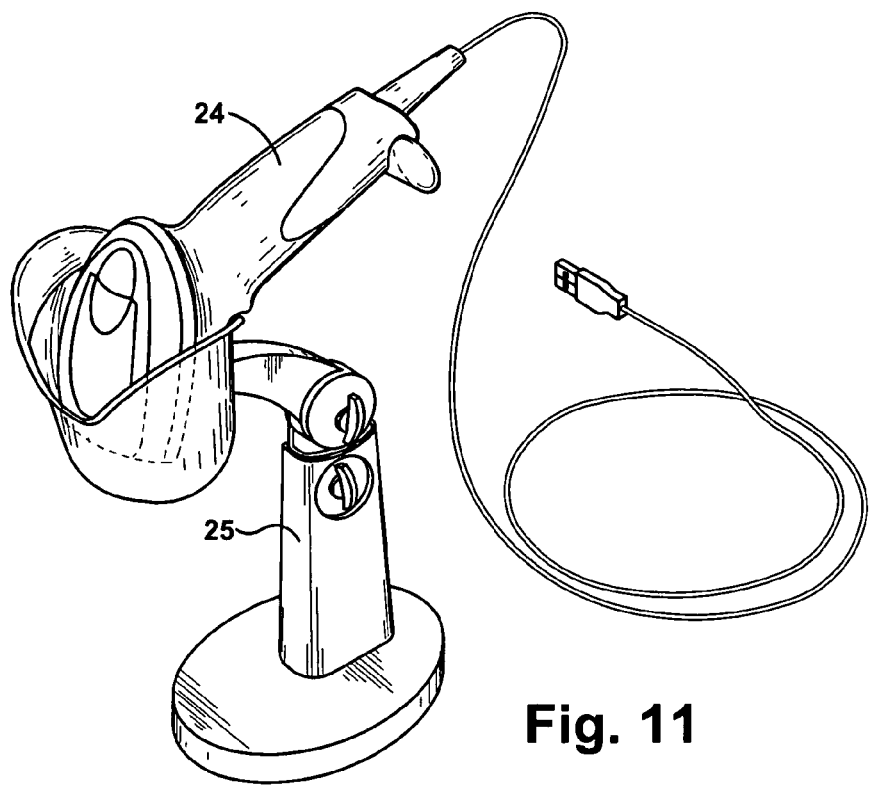
FIG. 11 is a perspective view of a hand held bar code reader positioned on a support or stand such as a weighing scale.
Figure 12:
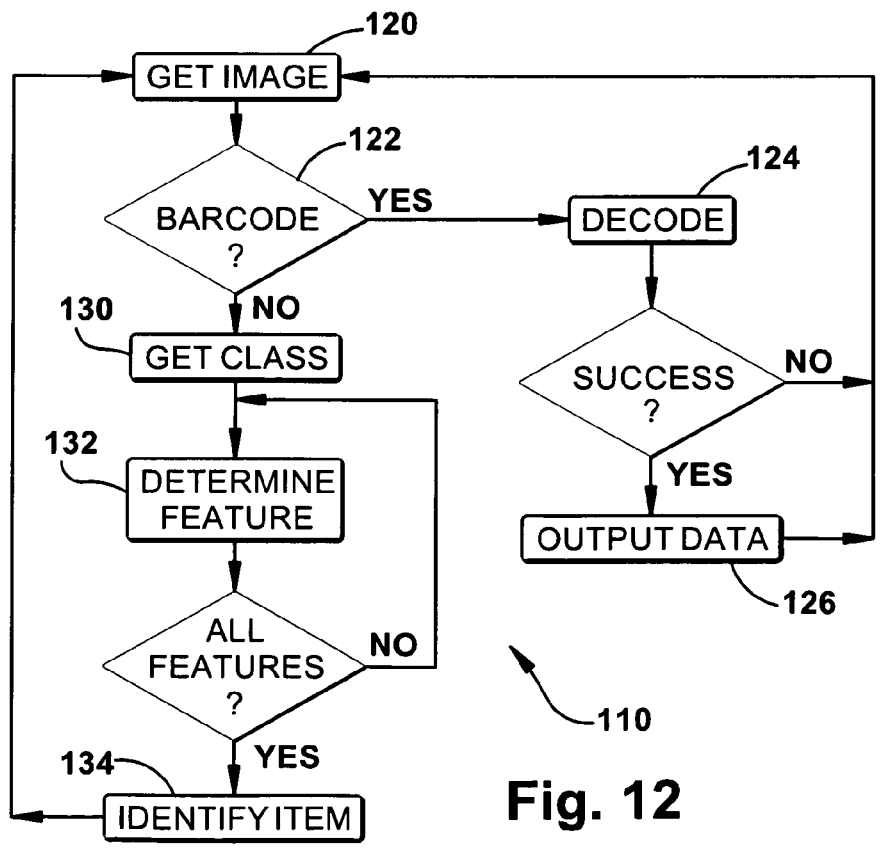
FIG. 12 is a flow chart of one sequence of evaluations performed by the exemplary bar code reader.

In accordance with one use, either a sales person or a customer will present or swipe a product or target object 32 selected for purchase to the housing 20. FIG. 11 depicts a handheld bar code reader 24 supported by a stand or support 25 such as the reader described in greater detailing in copending U.S. patent application Ser. No. 11/441,727, filed May 26, 2006 entitled "Hand Held Bar Code Reader with Improved Image Capture." The disclosure of this copending patent application is incorporated herein by reference. For one class of items, a target bar code 30 imprinted or affixed to the target object 32 will be presented in or swiped through a region near the windows H, V for reading, that is, imaging and decoding of the coded indicia of the target bar code. For another class of items, the object has no bar code and the imaging system 12 identifies the item based upon measurements of the dimensions or other features of the item derived from its image such as indicia on or attached to the object.

Imaging Optics

Figure 7:
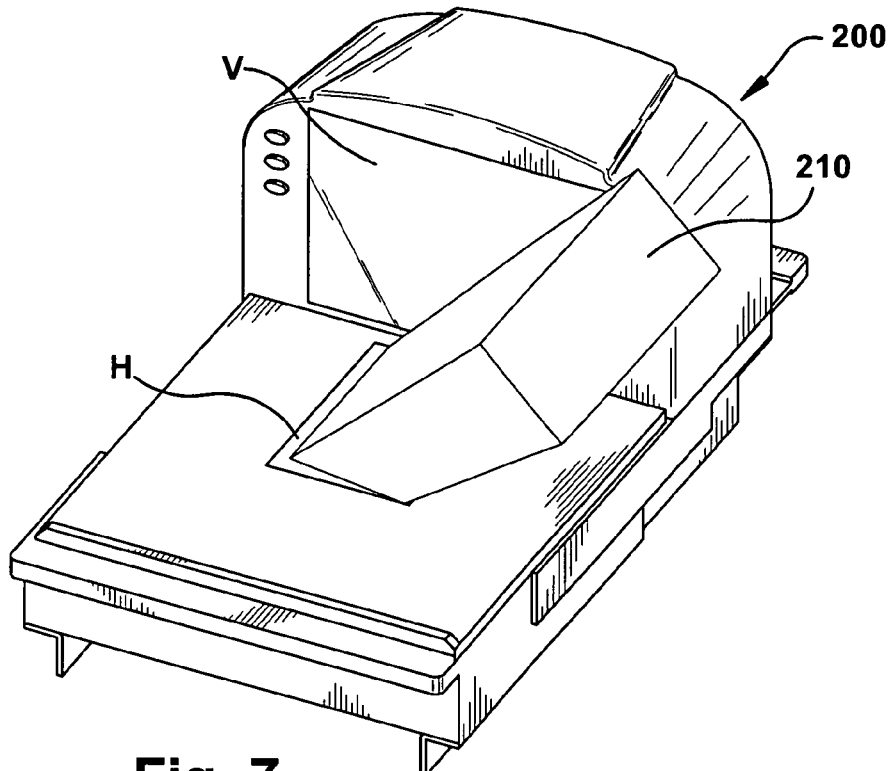
FIG. 7 is a perspective view of the imaging dual window scanner of FIG. 6, projecting an imaging field-of-view from a horizontal window.

Each camera assembly C1-C6 of the imaging system 12 captures a series of image frames of its respective field-of-view FV1-FV6. The series of image frames for each camera assembly C1-C6 is shown schematically as IF1, IF2, IF3, IF4, IF5, IF6 in FIG. 7. Each series of image frames IF1-IF6 comprises a sequence of individual image frames generated by the respective cameras C1-C6. As seen in the drawings, the designation IF1, for example, represents multiple successive images obtained from the camera C1. As is conventional with imaging cameras, the image frames IF1-IF6 are in the form of respective digital signals representative of raw gray scale values generated by each of the camera assembly C1-C6.

Digital signals 35 that make up the frames are coupled to a bus interface 42, where the signals are multiplexed by a multiplexer 43 and then communicated to a memory 44 in an organized fashion so that the processor knows which image representation belong to a given camera.

The image processors 15 access the image frames IF1-IF6 from memory 44 and search for image frames that include an imaged target bar code 30'. If the imaged target bar code 30' is present and decodable in one or more image frames, the decoder 16 attempts to decode the imaged target bar code 30' using one or more of the image frames having the imaged target bar code 30' or a portion thereof. If no bar code is present, the image processors look for items such as the screw 230 shown in FIG. 9 within the image.

Each camera includes a charged coupled device (CCD), a complementary metal oxide semiconductor (CMOS), or other imaging pixel array, operating under the control of the imaging processing system 40. In one exemplary embodiment, the sensor array comprises a two-dimensional (2D) CMOS array with a typical size of the pixel array being on the order of 752×480 pixels. The illumination-receiving pixels of the sensor array define a sensor array surface secured to a printed circuit board for stability. The sensor array surface is substantially perpendicular to an optical axis of the imaging lens assembly, that is, a z axis that is perpendicular to the sensor array surface would be substantially parallel to the optical axis of the focusing lens. The pixels of the sensor array surface are disposed in an orthogonal arrangement of rows and columns of pixels.

The reader circuitry 11 includes imaging system 12, the memory 44 and a power supply 11a. The power supply 11a is electrically coupled to and provides power to the circuitry 11 of the reader. Optionally, the reader 10 may include an illumination system 60 (shown schematically in FIG. 7) which provides illumination to illuminate the effective total field-of-view to facilitate obtaining an image 30' of a target bar code 30 that has sufficient resolution and clarity for decoding. An exemplary system uses light emitting diodes closely spaced from an associated charge coupled device for each of the cameras C1-C6 that are selectively activated to emit light under control of the processors 15.

Decoding Images

Figure 5:
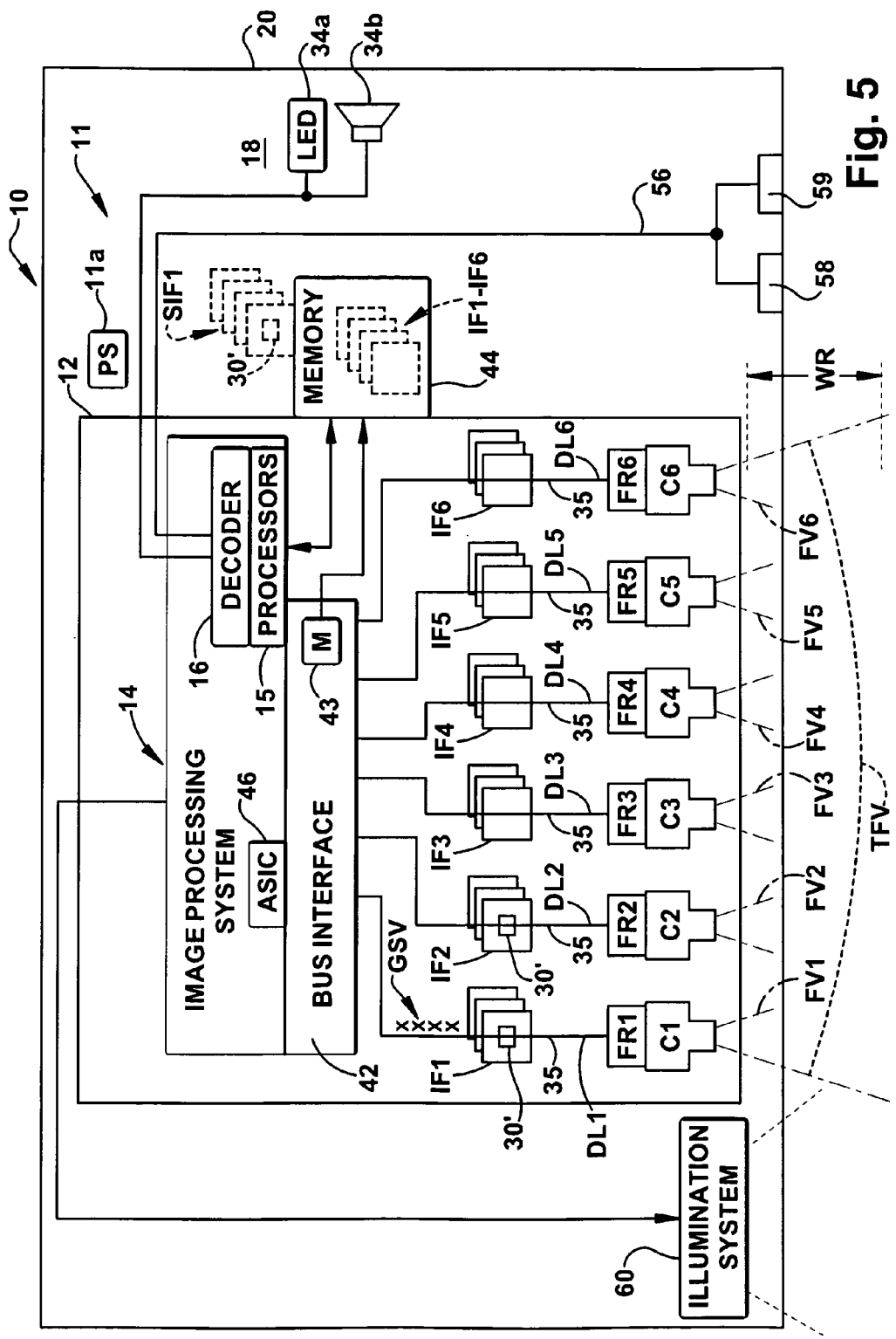
FIG. 5 is a schematic block diagram of selected systems and electrical circuitry of the bar code reader of FIG. 1.
Figure 6:
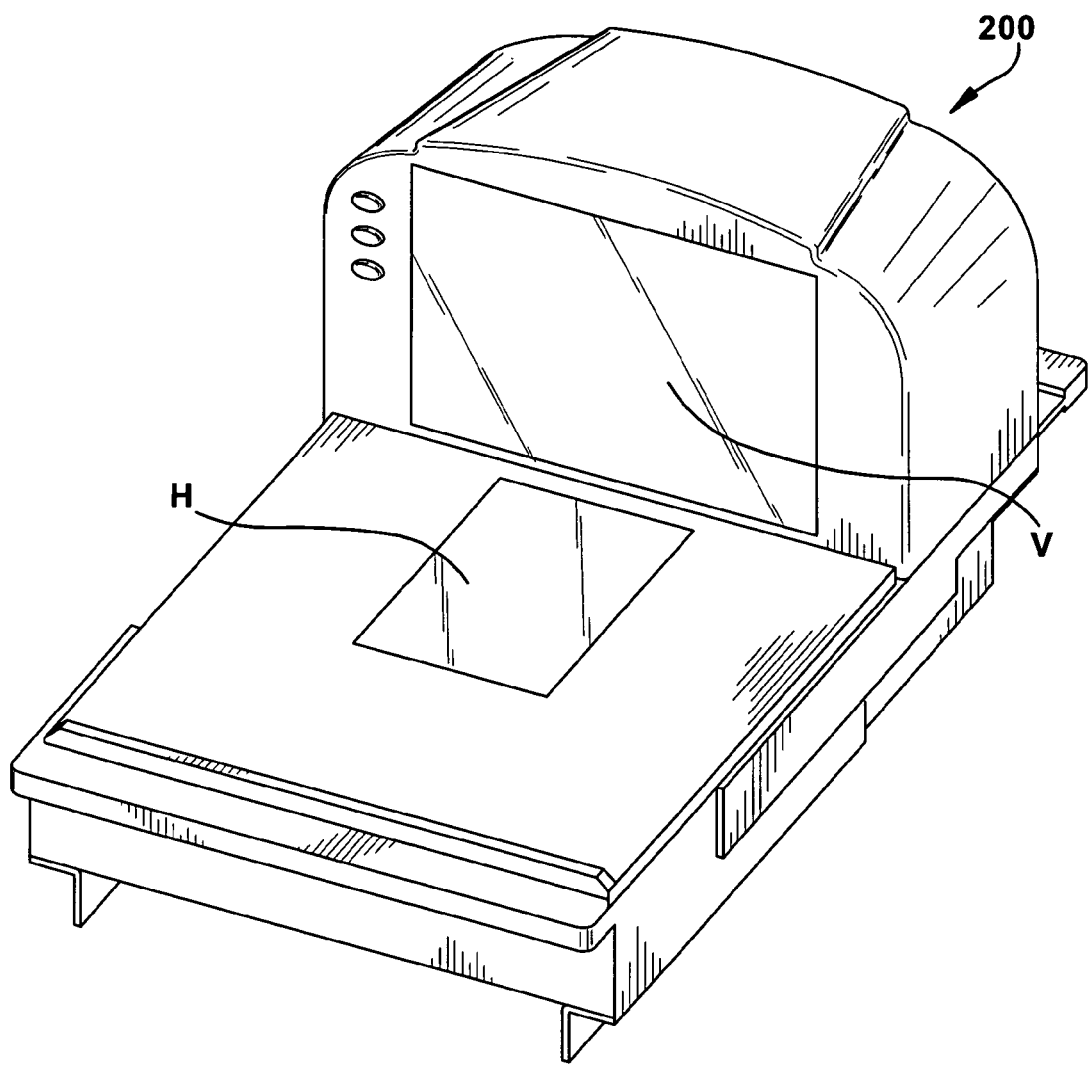
FIG. 6 is a perspective view of an imaging dual window scanner constructed in accordance with another example embodiment of the present disclosure.

As is best seen in FIG. 5, the digital signals 35 are received by the bus interface 42 of the image processing system 40, which may include the multiplexer 43, operating under the control of an application specific integrated circuit (ASIC) 46, to serialize the image data contained in the digital signals 35. The digitized values of the digitized signal 35 are stored in the memory 44. The digital values GSV constitute a digitized version of the series of image frames IF1-IF6, which for each camera assembly C1-C6 and for each image frame is representative of the image projected by the imaging lens assembly onto the pixel array during an exposure period. If the field-of-view of the imaging lens assembly includes the target bar code 30, then a digital image 30' of the target bar code 30 is obtained.

The decoding circuitry 14 performs a process 110 on selected image frames by getting an image 120 from memory and determining 122 if the image has a bar code. If so the processor 15 attempts to decode 124 any decodable image within the image frames, e.g., the imaged target bar code 30'. If the decoding is successful, decoded data 56, representative of the data/information coded in the target bar code 30 is then output 126 via a data output port 58 and/or displayed to a user of the reader 10 via a display 59. Upon achieving a good read of the target bar code 30, that is, the bar code 30 was successfully imaged and decoded, a speaker 34b and/or an indicator LED 34a is activated by the bar code reader circuitry 11 to indicate to the user that the target bar code 30 has been successfully read.

To acquire data from images of items that do not have bar codes with a barcode reader 10 requires a knowledge of the pixel per inch at a location having a fixed distance to the object or item that is imaged. For example a multiple camera reader has a window H upon which objects, such as a screw 230, being imaged can be positioned during imaging. One goal of use of the reader is to determine the pitch, length and type of screw based on length dimensions of the features of the screw. The reader can also distinguish, for example, between various head shapes (flat head versus rounded etc) by comparing the imaged shapes with a database of shapes stored in memory of the reader or stored in a host computer with which the reader communicates. The reader 10 looks at the object through the window H on which it rests so the distance from the imager or camera is known and measurements of the item are based on a fixed relation of pixels per inch of the sensor array that captures the image.

Another way to use an imaging based bar code reader is to image the item simultaneously with a target such a grid 231 (FIG. 10) on a weighing scale 234. Although in the embodiment of FIG. 10 the scale is separate from the reader 10 shown in FIG. 1, a scale could be incorporated into a reader 10 and the weighing surface would be part of the horizontal window H onto which products are placed. The grid has a specified known grid spacing between markings such as inches, centimeters etc. Such a system can be used with a handheld image reader 24 (FIG. 11) wherein the target is at or near the cash register or check out station so the item can be placed on the target grid 231 and the item and target are imaged simultaneously. No particular distance between the target grid 231 and reader is required. If no markings are present, however the spacing must be constant such as achieved by having the reader 24 mounted in the stand 25. The reader then uses a pre-calibrated pixel per dimension value to determine object features.

Figure 10:
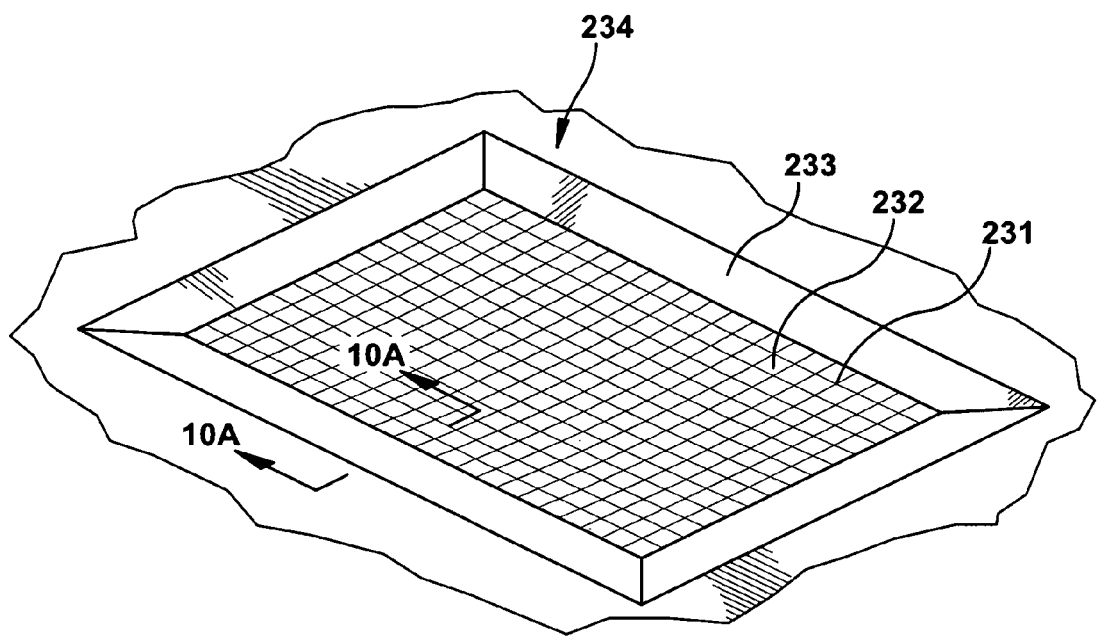
FIGS. 10 and 10A are depictions of a support such as a weighing scale for parts or objects not having a bar code affixed thereto.
Figure 10A:
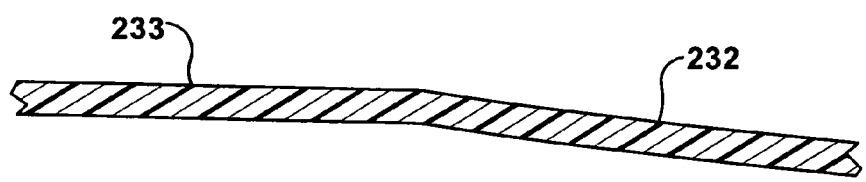

The support surface 232 shown in FIG. 10 can have a groove or be slightly concave (FIG. 10A) to keep round items from rolling away and in the exemplary embodiment this surface is bound by an included border 233. There can also be location features such as pins or other raised areas designed to enable a user to position an object on the target in a consistent way. This makes it easier for the bar code reader to locate the item being imaged in its field of view. In one embodiment, a surface 232 on which the grid 231 is affixed is a weighing scale surface or platform that forms part of the scale 234 and which transmits weight signals back to the processor or processors 15 in the reader for use in identifying features of non-bar code carrying parts.

The size of the object being imaged can be compared to reference marks on the grid. For example, if the marks are an inch apart, the processor can count pixels to see how many pixels appear between the marks, establishing a pixels per inch reference value. Such calibration would typically be done during manufacture of the reader.

Pixels distances across various dimensions of the object being imaged are subsequently determined during use of the reader to measure those features of the object of concern. Different classes of objects are identified by different features. A generic class type (screw, bolt, nut etc) is entered 130 at a user input to the reader. The reader determines 132 a specific feature of the object based on knowledge conveyed by the generic class object. Alternately, a variety of different classes are stored in the reader and the reader processor 15 determines by means of pattern matching the image of the object what generic class the object falls into. Once all features of an item (possibly including its weight) have been determined the processor identifies 134 the item and optionally displays the information on a visual display.

Figure 9:
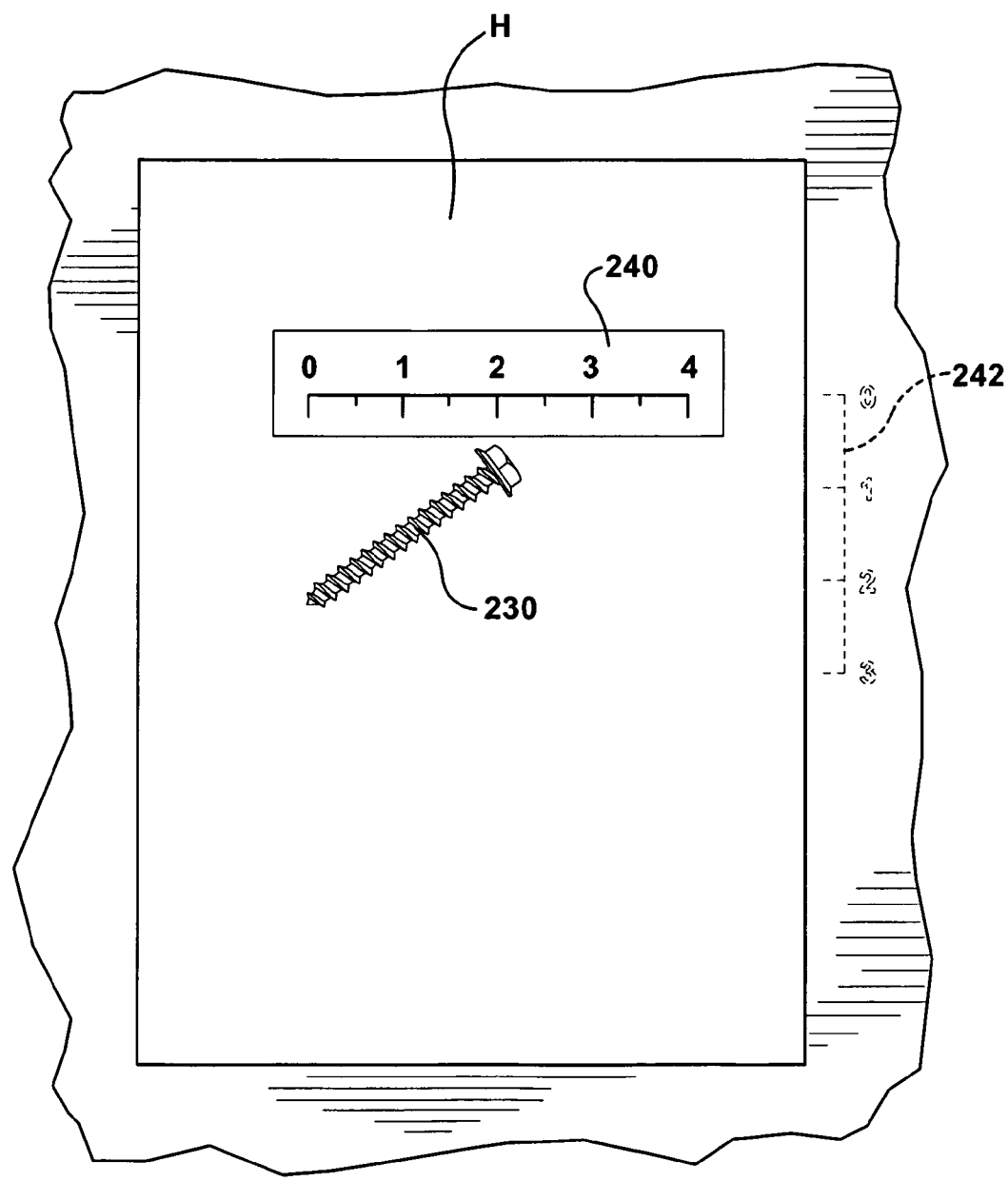
FIG. 9 is a plan view of the horizontal window with an object not containing a bar code for identification by the bar code reader.

In a stationary reader such as the one shown in FIG. 9, the distance to the window H is know and the number of pixels per inch can be programmed into the reader memory or calibrated into the reader by scanning a calibration target 240 during a calibration procedure at the factory. Reference marks are not visible in the same image as the object or item being measured after the calibration has been completed.

Another possibility is to have reference marks 242 inside the scanner near an edge of the window, within the camera field of view. In this instance fold mirrors are designed to extend the visible camera field of view outside the borders of the clear window aperture such as the aperture defined by the window H. Calibration marks around the window or on a calibration target placed on the window allow the reader to determine pixels per inch anywhere on the window even if the window is tilted with respect to the camera.

In the case of individual fruit or vegetables which have an identification stick but not a bar code, the number can be scanned and interpreted by the imager using an optical character recognition technology. Use of such optical character recognition can eliminate the need for manual data entry of such codes and instead allow the reader to determine the code and correlate the code with the product.

In one embodiment, the reader 10 is used in conjunction with a scale 234 that weighs items sitting on the horizontal window H. The scale can be used to confirm that the item has been correctly identified. For example, once a screw has been measured by the processors 15, and an identification has been tentatively made, the weight of the screw, as measured by the scale during the optical measurement process, is compared to a database of weights of various screws, nuts, washers, etc that are sold in a given store location. If the measured weight and the weight in the database match, it is highly likely that the identification is correct. Once an individual item has been identified, the scale count multiple items, if they are all placed on the scale by dividing the total weight by the unit weight determined for a single item. The customer can be charged for the correct number of screws without the clerk counting them.

The scale can also help distinguish between washers of different thickness, which will have different weights. Different thicknesses will not be distinguishable by the processors. Weights will also help distinguish screws, nuts and washers made of different materials. Stores may sell both metal and plastic screws, nuts and washers. The color (if a color reader is used) or gray scale value (with a monochrome sensor) can also help distinguish different finishes or materials. If a hand held scanner is being used a scale can be placed below or near the reader where the items being identified are to be placed. The weight database can be automatically created when new items are added to the store's inventory by storing the measured weight when a scanner sees a new item. Weights of several items can be averaged for more accurate standard weight for each item.

Camera Field of View

Figure 2:
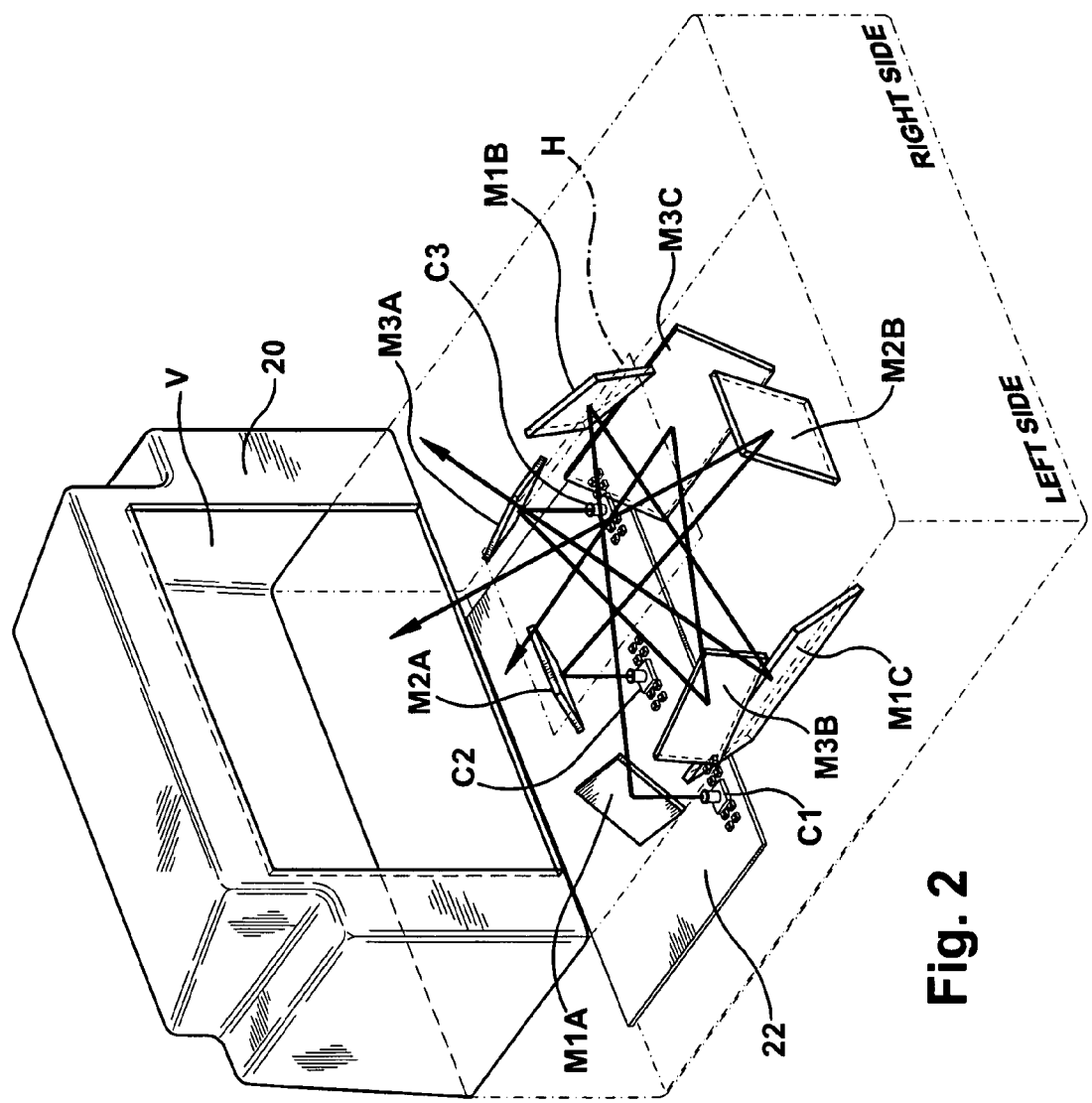
FIG. 2 is a perspective view of the reader of FIG. 1 with a portion of the reader housing removed to illustrate three cameras forming a portion of a plurality of cameras located on a printed circuit board.
Figure 8:
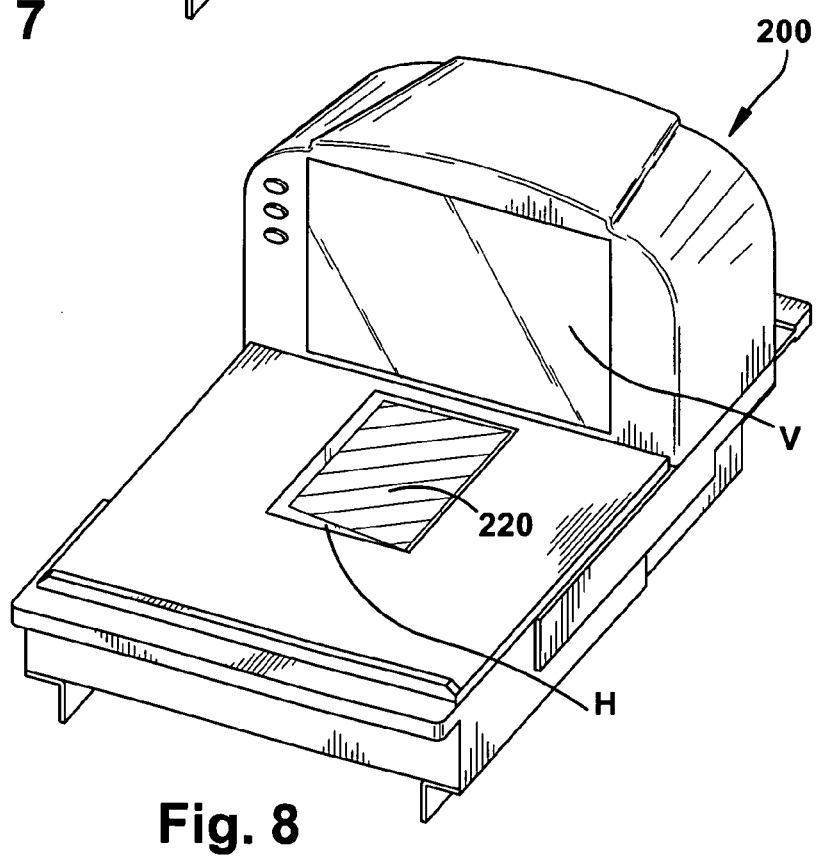
FIG. 8 is a perspective view of the imaging dual window scanner of FIG. 7, illustrating an imaging pattern.

Referring now to FIG. 2, a dual window bar code reader includes the printed circuit board 22 having six imaging cameras thereon, where three cameras having a field-of-view extending from a generally horizontal window H are shown, namely C1, C2, and C3. Camera or imager C1 and its associated optics faces generally vertically upward toward an inclined folding mirror M1A substantially directly overhead at a left side of the horizontal window H. The folding mirror M1A faces another inclined narrow folding mirror M1B located at a right side of the horizontal window H. The folding mirror M1B faces still another inclined wide folding mirror M1C adjacent the mirror M1A. The folding mirror M1C faces out through the generally horizontal window H toward the right side of the dual window scanner such to form an imaging field-of-view 210 illustrated in FIG. 7. A region of imaging coverage 220 resulting from the field-of-view projected from camera C1 is produced, substantially filling the scanning area illustrated on the horizontal window H in FIG. 8. Note, by adjusting the size and or angle of one or more of the mirrors, the field of view is adjusted to include the marking 242.

The camera or imager C3 and its associated optics are symmetrical with respect to a center line of the reader to imager C1. Camera C3 faces generally vertically upward toward an incline folding mirror M3A substantially directly overhead at a right side of the horizontal window H. The folding mirror M3A faces another inclined narrow folding mirror M3B located at a left side of the horizontal window H. The folding mirror M3B faces still another inclined wide folding mirror M3C adjacent the mirror M3A. The folding mirror M3C faces out through the generally horizontal window H toward the left side of the dual window reader.

Imager or camera C2 and its associated optics are located between imagers C1 and C3 and their associated optics. Imager C2 faces generally vertically upward toward an inclined folding mirror M2A substantially directly overhead generally centrally of the horizontal window H at one end thereof. The folding mirror M2A faces another inclined folding mirror M2B located at the opposite end of the horizontal window H. The folding mirror M2B faces out through the window H in an upward direction toward the vertical window V in the housing 20.

As illustrated in FIG. 3, the dual window reader has a camera or imager C4 and its associated optics faces generally vertically upward toward an incline folding mirror M4A substantially directly overhead at a left side of the vertical window V. The folding mirror M4A faces another inclined narrow folding mirror M4B located at a right side of the vertical window V. The folding mirror M4B faces still another inclined wide folding mirror M4C adjacent the mirror M4A. The folding mirror M4C faces out through the generally vertical window V toward the right side of the dual window reader.

In FIG. 4 camera or imager C6 and its associated optics is mirror symmetrical to imager C4. Camera C6 faces generally vertically upward toward an incline folding mirror M6A substantially directly overhead at a right side of the vertical window V. The folding mirror M6A faces another inclined narrow folding mirror M6B located at a left side of the vertical window V. The folding mirror M6B faces still another inclined wide folding mirror M6C adjacent the mirror M6A. The folding mirror M6C faces out through the generally vertical window V toward the left side of the dual window reader.

In FIG. 4, imager or camera C5 and its associated optics are located generally centrally between imagers C4 and C6 and their associated optics. Imager C5 faces generally vertically upward toward an inclined folding mirror M5A substantially directly overhead generally centrally of the vertical window V at one end thereof. The folding mirror M5A faces out through the window V in a downward direction toward the horizontal window H in the housing 20.

Features and functions of the fold mirrors shown in the figures are described in further detail in U.S. patent application Ser. No. 12/245,111 to Drzymala et al filed Oct. 3, 2008 which is incorporated herein by reference. When a mirror is used in an optical layout to reflect the reader field of view to another direction, the mirror may be thought of as an aperture (an aperture is a defined as a hole or an opening through which light is admitted). The depictions in the copending application show optical layouts which represent one or more fold mirrors that achieve long path lengths within the reader housing. When the mirror clips or defines the imaging or camera field of view it is referred to as vignetting. When the mirror clips extraneous or unneeded light from a source such as a light emitting diode, it is commonly referred to as baffling. In the Figures three fold mirrors are used to define a given field of view. Other numbers of mirrors, however, could be used to direct light to a field of view outside the housing.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

The invention claimed is:

1. A bar code reader for reading bar codes and determining a feature of a target object not having a bar code affixed thereto, the bar code reader comprising:
   a housing including one or more transparent windows and defining a housing interior region, a target object being swiped or presented in relation to the transparent windows for imaging a target object;
   an illumination system having one or more illumination sources positioned within the housing interior region for providing illumination to illuminate the target object through one of the transparent windows;
   a camera having an image capture sensor array positioned within the housing interior region for capturing an image of the target object through one of the transparent windows;
   an image processing system comprising a processor for interpreting the image of the target object to determine a presence of a bar code and if present decoding the bar code in the image of the target object and in the absence of a bar code, identifying the target object by determining a feature of the target object from the image of the target object captured by the imaging system, and wherein the feature includes a length dimension of a characteristic of the target object; and
   a calibration object at a distance from the one of the transparent windows, the calibration object having a visible calibration scale affixed thereto for imaging by the camera to allow the image processing system to determine dimensions of object features within the field of view.

2. The bar code reader of claim 1 wherein the housing has a horizontal window onto which the target object is placed for imaging.

3. The bar code reader of claim 1 further comprising a calibration scale attached to the housing having regularly spaced markings for imaging by the processing system for calibrating said processing system.

4. The bar code reader of claim 1 additionally comprising a scale and wherein a feature of an item not having a bar code affixed thereto includes the item's weight.

5. A method for identifying a target object comprising:
providing a housing having one or more transparent windows that define a region for movement and/or positioning of an object;
positioning a camera having a sensor array within the housing for imaging bar codes on objects outside the housing;
illuminating the target object through one of the transparent windows with one or more illumination sources positioned within the housing interior region;
capturing an image of the target object through one of the transparent windows as light from the target object impinges onto said sensor array;
interpreting the image of the target object to determine a presence of a bar code and if present decoding the bar code and if not present identifying the target object by determining a feature of the target object from the image of the target object and wherein the feature includes a length dimension of a characteristic of the target object; and
comprising placing a target object in close proximity to a calibration object having regular markings to simultaneously image both the calibration object and the target object and then correlating the feature with spacings between markings on the calibration object, wherein the calibration object is located at a distance from the one of the transparent windows.

6. The method of claim 5 additionally comprising calibrating the sensor array to determine a pixel per length characteristic of said reader.

7. The method of claim 6 wherein imaging of the calibration object is performed prior to delivery of the reader to a customer and a pixel per length characteristic is stored in a memory of the reader.

8. The method of claim 5 comprising determining a weight of an item not bearing a bar code.

9. The method of claim 8 wherein the weight of an item is used to confirm a visual determination of another item feature based on an image of that item.

10. The method of claim 8 wherein multiple number of identical items are placed on a scale surface and the weight of the multiple number of identical items is used to count said items by dividing a total weight by a unit weight per item.

11. An imaging system for use in a multi-camera imaging-based bar code reader having a housing supporting a plurality of transparent windows and defining an interior region, a target object being presented near or moved with respect to the plurality of windows for imaging a target bar code on a target object, the imaging system comprising:
a plurality of camera assemblies coupled to an image processing system, each camera assembly of the plurality of camera assemblies being positioned within the housing interior position and defining a field of view which is different than a field of view of each other camera assembly of the plurality of camera assemblies, each camera assembly including a sensor array and a light source in close proximity to the sensor array for illuminating a field of view;
one or more mirrors associated with each of the plurality of camera assemblies for returning light bouncing off a target object back to the sensor array of said camera assembly;
one or more processors for evaluating an image of the target object captured through one of the transparent windows by said plurality of camera assemblies to determine a presence of a bar code and if present, the one or more processors are operative to decode the bar code in the image f the target object captured through one of the transparent windows and if not present, the one or more processors are operative to determine a non bar code feature of target objects either presented within or swiped through at least one camera field of view and to identify the target objects based on the non bar code feature, and wherein the non bar code feature includes a length dimension of a characteristic of the target objects; and
a calibration object at a distance from the one of the transparent windows, the calibration object having a visible calibration scale affixed thereto for imaging by the camera to allow the image processing system to determine dimensions of object features within the field of view.

12. The system of claim 11 a calibration object is imaged to calibrate the reader.

13. An imaging-based bar code reader for imaging a target bar code on a target object, the bar code reader comprising:
a housing supporting one or more transparent windows and defining an interior region, a target object being presented to or swiped through the housing for imaging a target bar code;
an imaging system comprising
camera means having an image capture sensor array positioned within the housing interior region for capturing an image of a bar code within a camera field of view;
light source means for the camera means positioned in close proximity to the image capture sensor of said camera for emitting light; and
light reflecting means for defining multiple camera fields of view including mirrors positioned with respect to said light source and the sensor array along a light path to transmit light from the light source means to the field of view and transmit light that bounces from a target in the field of view back along said light path to the image capture sensor array;
image processing means for selectively activating the light source means and interpreting a bar code or non-bar code features from an image of the target object captured through one of the transparent windows by the imaging system and if a bar code is present, the image processing means is operative to decode the bar code in the image of the target object captured through one of the transparent windows and in the absence of a bar code, the image processing means is operative to identify the target object based on the non bar code feature, and wherein the non bar code feature includes a length dimension of a characteristic of the target objects; and
a calibration object at a distance from the one of the transparent windows, the calibration object having a visible calibration scale affixed thereto for imaging by the camera to allow the image processing system to determine dimensions of object features within the field of view.

* * * * *